US010695911B2

(12) United States Patent
Jiang et al.

(10) Patent No.: US 10,695,911 B2
(45) Date of Patent: Jun. 30, 2020

(54) ROBOT NAVIGATION AND OBJECT TRACKING

(71) Applicant: Futurewei Technologies, Inc., Plano, TX (US)

(72) Inventors: Wei Jiang, Santa Clara, CA (US); Wei Wang, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 351 days.

(21) Appl. No.: 15/870,626

(22) Filed: Jan. 12, 2018

(65) Prior Publication Data

US 2019/0217476 A1    Jul. 18, 2019

(51) Int. Cl.
*B25J 9/16* (2006.01)
*B25J 19/02* (2006.01)
*B25J 11/00* (2006.01)
*B25J 13/08* (2006.01)
(Continued)

(52) U.S. Cl.
CPC .......... *B25J 9/1697* (2013.01); *B25J 11/008* (2013.01); *B25J 13/08* (2013.01); *B25J 19/023* (2013.01); *G05D 1/0246* (2013.01); *G05D 3/20* (2013.01); *G06T 2207/20081* (2013.01); *G06T 2207/30241* (2013.01)

(58) Field of Classification Search
None
See application file for complete search history.

(56) References Cited

U.S. PATENT DOCUMENTS

| 10,254,759 B1* | 4/2019 | Faust ............ G06N 3/006 |
| 2011/0064269 A1 | 3/2011 | Rajpurohit et al. |
| 2018/0174038 A1* | 6/2018 | Jiang ............ G06N 3/08 |

(Continued)

FOREIGN PATENT DOCUMENTS

| CN | 105137967 A | 12/2015 |
| CN | 106873585 A | 6/2017 |
| CN | 106875428 A | 6/2017 |

OTHER PUBLICATIONS

"International Application No. PCT/CN2019/071318, International Search Report and Written Opinion dated Apr. 10, 2019", (Apr. 10, 2019), 10 pgs.

(Continued)

*Primary Examiner* — Bhavesh V Amin
(74) *Attorney, Agent, or Firm* — Schwegman Lundberg & Woessner, P.A.

(57) ABSTRACT

A system and method of tracking an object and navigating an object tracking robot includes receiving tracking sensor input representing the object and an environment at multiple times, responsive to the tracking sensor input, calculating positions of the robot and the object at the multiple times, and using a computer implemented deep reinforcement learning (DRL) network trained as a function of tracking quality rewards and robot navigation path quality rewards, the DRL network being responsive to the calculated positions of the robot and the object at the multiple times to determine possible actions specifying movement of the object tracking robot from a current position of the robot and target, determine quality values (Q-values) for the possible actions, and select an action as a function of the Q-values. A method of training the DRL network is also included.

20 Claims, 11 Drawing Sheets

(51) Int. Cl.
      *G05D 1/02*         (2020.01)
      *G05D 3/20*         (2006.01)

(56)            References Cited

U.S. PATENT DOCUMENTS

| | | | |
|---|---|---|---|
| 2018/0281180 A1* | 10/2018 | Yamamoto | B25J 9/1664 |
| 2018/0348716 A1* | 12/2018 | Perez | G05B 13/027 |
| 2018/0370027 A1* | 12/2018 | Oota | B25J 9/161 |
| 2019/0061147 A1* | 2/2019 | Luciw | B25J 9/163 |
| 2019/0217476 A1* | 7/2019 | Jiang | B25J 9/1697 |
| 2019/0220737 A1* | 7/2019 | Yao | G06N 3/04 |
| 2019/0220744 A1* | 7/2019 | Yao | G05D 1/0088 |

OTHER PUBLICATIONS

Li, Yuxi, "Deep Reinforcement Learning: An Overview", arXiv:1701.07274v3 [cs.LG] Jul. 15, 2017, (2017), 66 pgs.
Xiang, Yu, et al., "Learning to Track: Online Multi-Object Tracking by Decision Making", *2015 IEEE International Conference on Computer Vision*, (2015), 4705-4713.

\* cited by examiner

ROBOT NAVIGATION AND OBJECT TRACKING

FIELD OF THE INVENTION

The present disclosure is related to robot navigation and object tracking.

BACKGROUND

Tracking a moving object is an important function for home service robots. For example, a robot can follow the owner to provide necessary assistance, or the robot can follow a suspect for home security reasons.

Tracking objects in videos has been actively studied in the field for the past decades, such as tracking cars in surveillance videos for traffic monitoring, or tracking people in surveillance videos for security monitoring. In these previous works, the cameras are either static or moving passively. That is, the camera movement is not controlled by the object tracking methods. For instance, in surveillance videos, the cameras are normally fixed, and the camera motion shown in the video is mostly from camera shaking for a variety of reasons.

Tracking a moving object for home service robots is quite different from the above object tracking tasks in videos. The robot is a moving platform that needs to navigate through a dynamic environment. In other words, besides tracking a target object, the robot actively decides how to move to track the moving object, and at the same time, to navigate through an environment that is either known or unknown, and to avoid other obstacles (such as other moving or static objects) in the environment.

A Simultaneous Localization and Mapping (SLAM) technology enables a robot to navigate through a known or unknown environment. In SLAM, the robot builds and maintains a 2D/3D map of a known or unknown environment and at the same time, localizes (determines its location) itself in the built environment map. Other techniques, such as reinforcement learning (RL) have also been used to facilitate robots in navigation and obstacle avoidance in pre-built environment maps with dynamic small-scale changing components such as static or moving obstacles.

SUMMARY

Various examples are now described to introduce a selection of concepts in a simplified form that are further described below in the detailed description. The Summary is not intended to identify key or essential features of the claimed subject matter, nor is it intended to be used to limit the scope of the claimed subject matter.

According to one aspect of the present disclosure, a method of tracking an object and navigating an object tracking robot includes receiving tracking sensor input representing the object and an environment at multiple times, responsive to the tracking sensor input, calculating positions of the robot and the object at the multiple times, and using a computer implemented deep reinforcement learning (DRL) network trained as a function of tracking quality rewards and robot navigation path quality rewards, the DRL network being responsive to the calculated positions of the robot and the object at the multiple times to determine possible actions specifying movement of the object tracking robot from a current position of the robot and target, determine quality values (Q-values) for the possible actions, and select an action as a function of the Q-values.

Optionally, in any of the preceding aspects, a further implementation of the aspect includes wherein the tracking quality rewards are a function of a size of the object observed divided by the size of the object and a distance of the object from the object tracking robot.

Optionally, in any of the preceding aspects, a further implementation of the aspect provides that the tracking quality rewards, $r_k$, are calculated in accordance with the following equation:

$$r_k = \frac{\text{Size(observed)}}{\text{Size(object)}} \cdot \frac{\text{Dist}(x_{t0} - C_{tx})}{L_{tx}} \cdot \frac{\text{Dist}(y_{t0} - C_{ty})}{L_{ty}}$$

where Size(object) and Size(observed) are sizes, in terms of pixel numbers, of the object and the actually observed portion of the object respectively, $C_{tx}$ and $C_{ty}$, an ideal horizontal and vertical location in an input sensing frame $I_t$, $L_{tx}$ and $L_{ty}$, are normalization factors, $x_{t0}$ and $y_{t0}$ are a location of the object, and Dist is a distance measurement to the object.

Optionally, in any of the preceding aspects, a further implementation of the aspect provides that the robot navigation path quality rewards, rp, are defined as a function of the shortest valid distance between the object and the robot.

Optionally, in any of the preceding aspects, a further implementation of the aspect provides that the DRL network is further trained as a function of a traversability quality reward rv for the set of possible actions specifying movement of the object tracking robot.

Optionally, in any of the preceding aspects, a further implementation of the aspect provides that the traversability quality reward rv is defined as a function of an average distance between the object tracking robot and potential obstacles.

Optionally, in any of the preceding aspects, a further implementation of the aspect provides that the robot and object reside in the environment that is represented by a map, and the traversability quality reward $r_v = F_v$ (average$_{T_m \in \Omega}\{\text{Dist}(T_{t+1}, T_m)\}$), where Dist is a distance measurement between the robot and obstacle and $T_m \in \Omega$ are a set of map points that represents a surface of an obstacle or wall and are within a distance threshold to Tt+1.

Optionally, in any of the preceding aspects, a further implementation of the aspect provides that the quality rewards are weighted.

Optionally, in any of the preceding aspects, a further implementation of the aspect provides that the sensing input comprises RGB image frame pixels, and further includes creating a sensing input by stacking pixels of multiple input sensing image frames in a past time window together, and wherein the DRL network uses the sensing input to estimate rewards and determine actions.

Optionally, in any of the preceding aspects, a further implementation of the aspect provides that the DRL network includes a forgetting factor to weight long term versus short term rewards.

According to one aspect of the present disclosure, a method of training a deep reinforcement learning (DRL) network to track an object and navigate a robot in an environment includes receiving tracking sensor input representing the object and the environment at multiple times, responsive to the tracking sensor input, calculating positions of the robot and the object at the multiple times, computing a tracking quality reward as a function of maintaining consisting object tracking at the multiple times, computing a navigation path quality reward as a function of an effective navigation path, and training the DRL network responsive to the tracking quality reward and navigation path quality reward over multiple actions of moving the robot.

Optionally, in any of the preceding aspects, a further implementation of the aspect provides that the tracking quality reward is calculated as a function of a size of the object observed divided by the size of the object and distance of the object from the robot.

Optionally, in any of the preceding aspects, a further implementation of the aspect provides that the DRL network is further responsive to estimate a traversability quality reward rv for a set of possible actions specifying movement of the object tracking robot, and determine the action via the DRL network that has also been trained as a function of the traversability quality reward rv.

Optionally, in any of the preceding aspects, a further implementation of the aspect provides that the robot and object reside in the environment that is represented by a map, and the traversability quality reward $r_v = F_v$ (average$_{T_m \in \Omega}${Dist($T_{t+1}$, $T_m$)}), where Dist is a distance measurement between the robot and obstacle and $T_m \in \Omega$ are a set of map points that representing the surface of an obstacle or wall and are within a distance threshold to Tt+1.

Optionally, in any of the preceding aspects, a further implementation of the aspect provides that the sensing input comprises RGB image frame pixels, and further includes creating a sensing input by stacking pixels of multiple input sensing image frames in a past time window together, and wherein the DRL network uses the sensing input to estimate rewards and determine actions.

Optionally, in any of the preceding aspects, a further implementation of the aspect includes calculating a target loss, and updating the DRL network as a function of the target loss.

According to one aspect of the present disclosure, a system for tracking an object and navigating an object tracking robot includes a memory storage comprising instructions and a processor in communication with the memory, wherein the processor executes the instructions to obtain tracking sensor input representing the object and an environment at multiple times, responsive to the tracking sensor input, calculate positions of the robot and the object at the multiple times, use a deep reinforcement learning (DRL) network that has been trained as a function of an object tracking quality reward and a robot navigation path quality reward to calculate positions of the robot and the object at the multiple times and determine an action specifying movement of the object tracking robot via the DRL network.

Optionally, in any of the preceding aspects, a further implementation of the aspect provides that the processor further executes the instructions to move the robot in accordance with the action.

Optionally, in any of the preceding aspects, a further implementation of the aspect includes a robot, wherein the memory storage and processor are integrated with the robot.

Optionally, in any of the preceding aspects, a further implementation of the aspect provides that the DRL network has been trained as a further function of a traversability reward.

Any one of the foregoing examples may be combined with any one or more of the other foregoing examples to create a new embodiment within the scope of the present disclosure.

DETAILED DESCRIPTION

Figure 1:
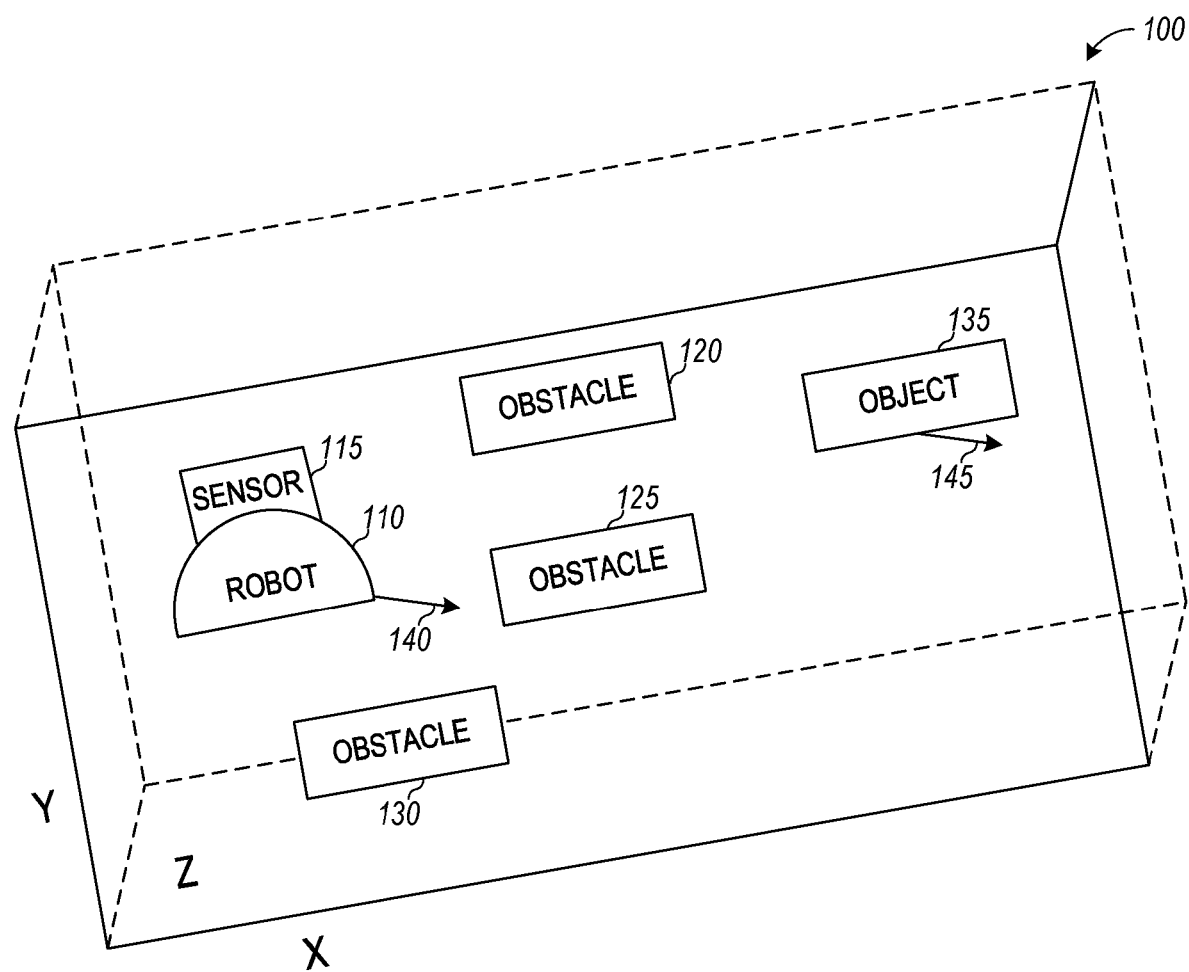
FIG. 1 is a block perspective diagram of an environment containing a mobile robot, an object to be tracked, and one or more obstacles according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

Robots that track objects in an environment have used many different techniques for navigation within the environment. However, such techniques may lead to the robot moving to a position from which the object or objects being tracked are no longer visible. This may occur for example when the robot needs to avoid an obstacle in the environment. The obstacle may also be dynamic, which introduces further complexities into navigation, increasing the chances that the robot may move to a position from which the object cannot be seen, leading to a failure in tracking the object.

For object tracking in videos, reinforcement learning (RL) has been used to facilitate online multi-object tracking in making decisions about object association issues. RL is basically a type of learning where decisions are made and evaluated, with a reward being given for the decision. The reward can be modified based on how good the decision was. A separate RL network has also been used in robot navigation, again with the navigation decisions being rewarded based on how good the navigation decision was.

In various embodiments of the present subject matter, a combined object tracking and navigation system is trained based on rewards that are related to both object tracking and navigation decisions. The system may be referred to as a deep reinforcement learning (DRL) network. The DRL network facilitates simultaneous localization and mapping (SLAM) and moving object tracking. Training may be done in a simulated environment to speed up the training Speed of training in a simulated or virtual environment can be faster than training in a real world environment because in the virtual environment, one does not have to wait for the robot and/or the tracked object to physically move, as movements occur at the speed of computer processing.

In one embodiment, three types of reward functions may be used for DRL network learning during a training stage: a path quality reward to encourage effective navigation path, a tracking quality reward to encourage consistent object tracking, and a traversability reward to avoid dynamic obstacles. Note that where dynamic obstacles are minimal or can be ignored, the DRL network may be sufficiently trained on the path quality reward and the tracking quality reward, without use of the traversability reward.

Training may be performed over a large set of tracking and navigation examples over static and dynamic real-world and simulated environments. A robot utilizing the DRL network or system can then effectively conduct simultaneous navigation and object tracking in a new dynamic environment using the trained DRL network to select effective navigation paths to avoid obstacles and keep the target object within sight, consistently track the target object, and avoid dynamic obstacles.

FIG. 1 is a block perspective diagram of an environment 100 containing a mobile robot 110 that includes a sensor 115, such as a video camera, one or more obstacles 120, 125, and 130, and an object 135. Lines labeled X, Y, and Z are used to indicate that the environment 100 may be three dimensional in nature and correspond to a Cartesian coordinate system for a three-dimensional space. The line labeled z may be visualized as rising up from the x and y lines which can be visualized as extending at right angles on the viewing surface, such as paper when printed, or a display screen. The robot 110 may include circuitry to implement the object tracking and navigation system to control the robot to navigate as indicated by arrow 140 within the environment while avoiding obstacles and maintaining the ability to track the object 135, which may also be moving as indicated by arrow 145. The arrows 140 and 145 are simply meant to represent the ability to move and not an actual direction in which the robot 110 and object 135 are moving. In some embodiments, obstacles may also move. Such obstacles may be referred to as dynamic obstacles. The robot may move in the X-Y plane, or may move three dimensionally in the case of a helicopter type drone.

Figure 2A:
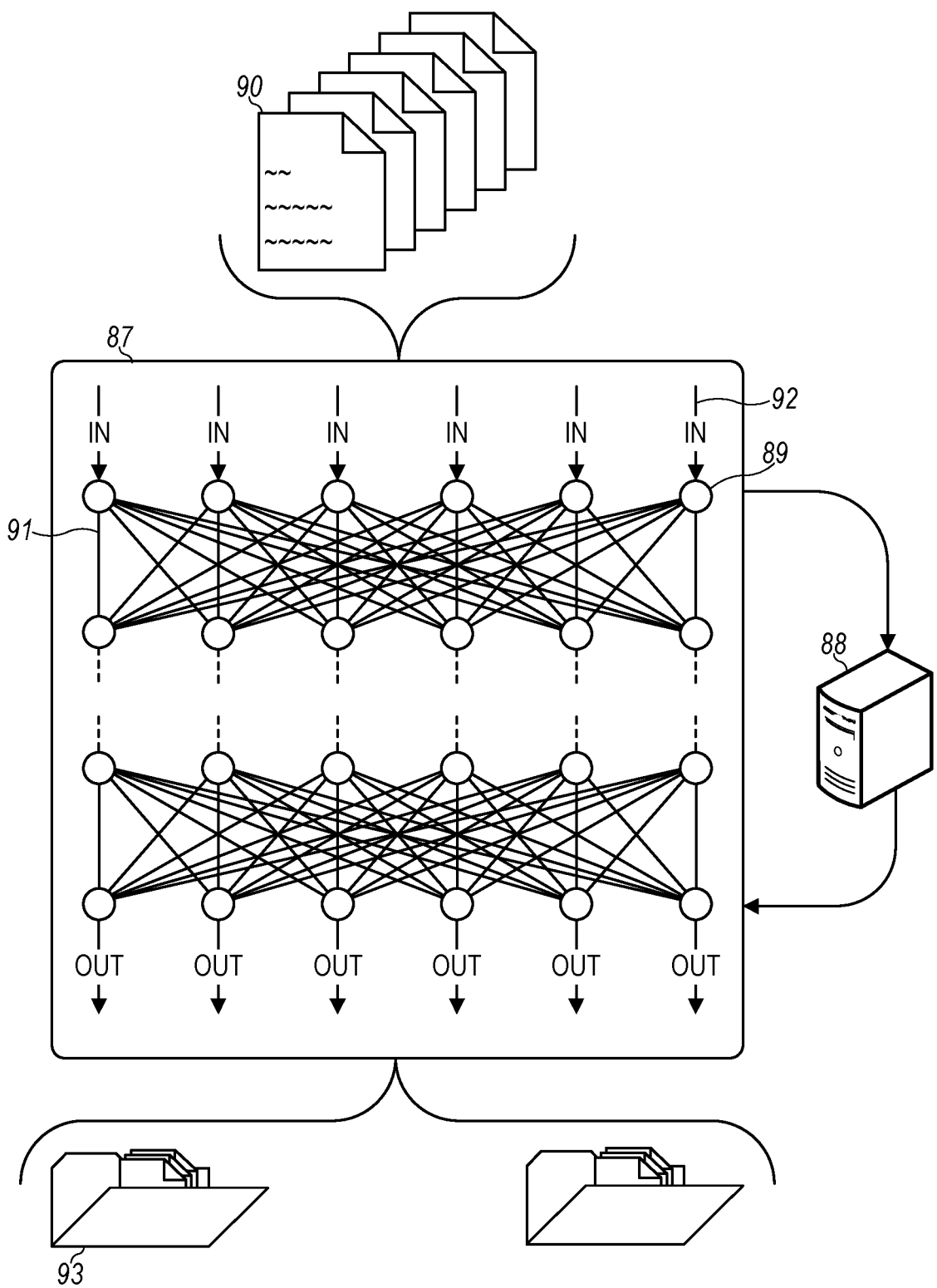
FIG. 2A is a block flow diagram illustrating an example neural network for use in a navigation and tracking system according to an example embodiment.
Figure 2B:
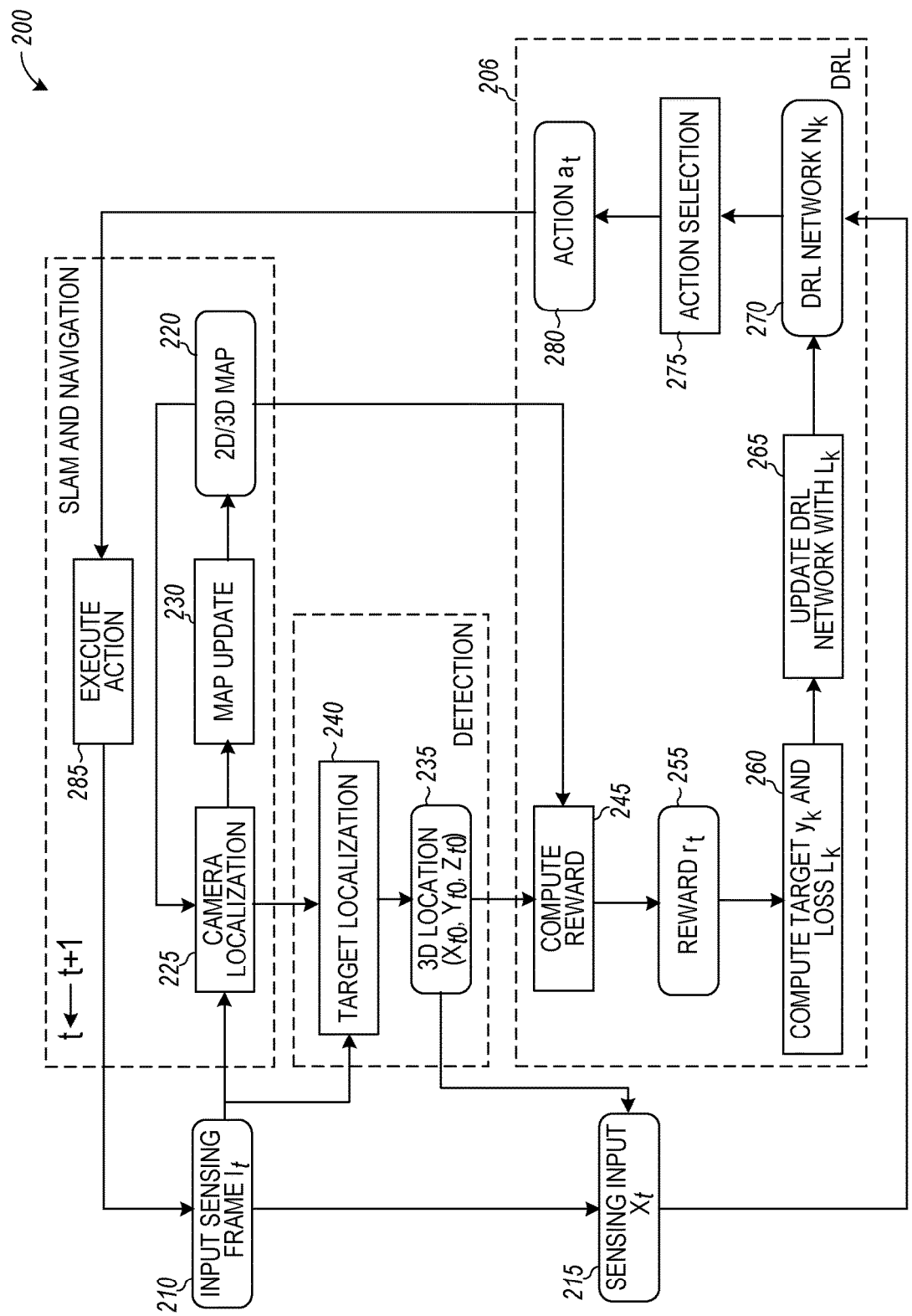
FIG. 2B is a block flow diagram illustrating a training stage for a navigation and tracking system DRL network according to an example embodiment.
Figure 11:
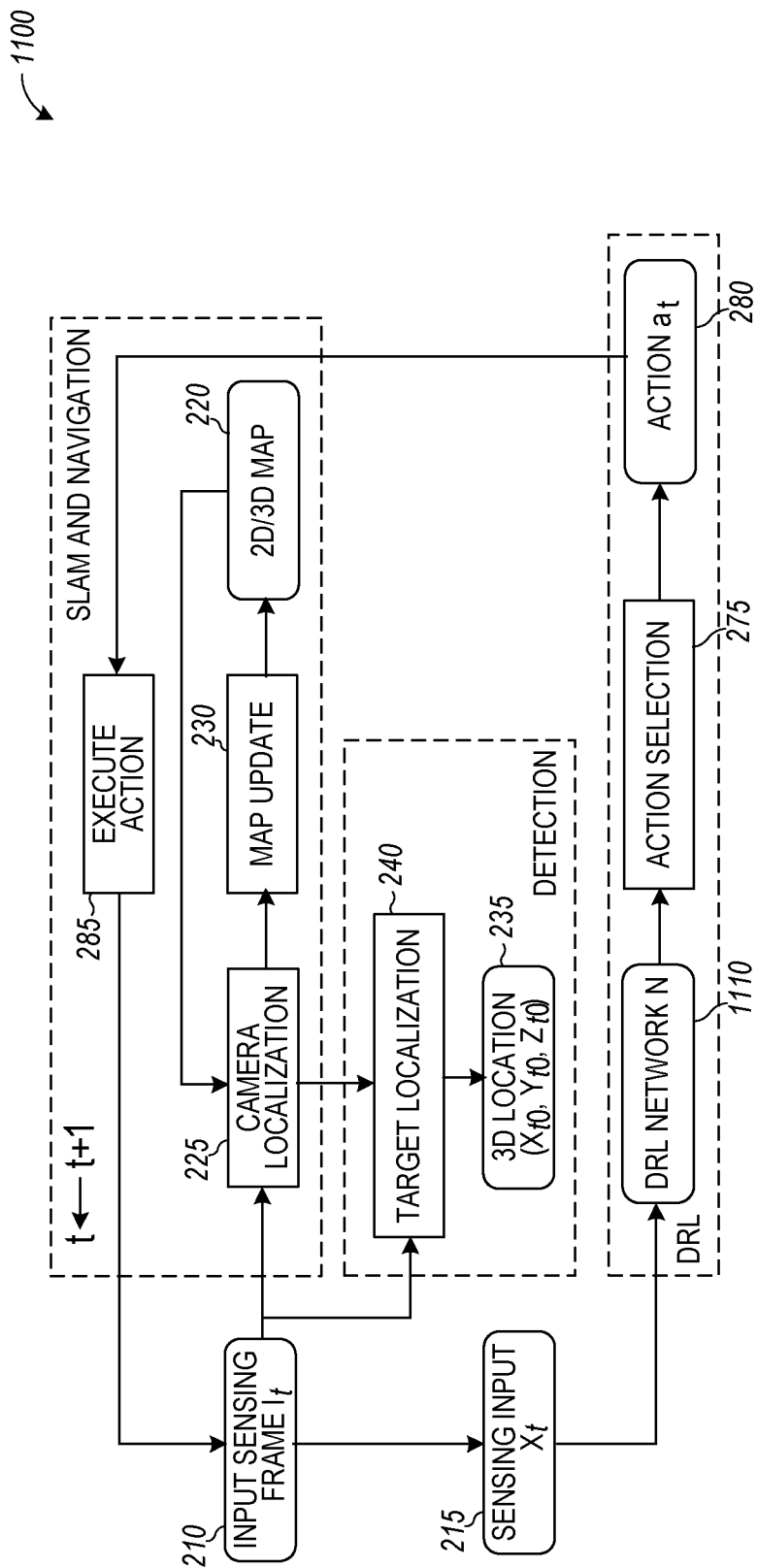
FIG. 11 is a block flow diagram illustrating simultaneous robot navigation and object tracking utilizing a trained DRL network according to an example embodiment.

The object tracking and navigation system utilizes an artificial intelligence (AI) module that receives position information about the robot and object, as well as data from reward functions. FIG. 2A provides some background information regarding neural networks to aid in understanding operation of various embodiments. FIG. 2B provides a view of how module (270 in FIG. 2B) is trained with sensed locations of the robot and object and a reward as inputs. FIG. 11 shows how locations are used as inputs to the artificial intelligence module (1110 in FIG. 11) and how the module fits into the overall tracking and navigation system and generates actions for the robot.

Artificial intelligence (AI) is a field concerned with developing decision making systems to perform cognitive tasks that have traditionally required a living actor, such as a person. Artificial neural networks (ANNs) are computational structures that are loosely modeled on biological neurons.

Generally, ANNs encode information (e.g., data or decision making) via weighted connections (e.g., synapses) between nodes (e.g., neurons). Modern ANNs are foundational to many AI applications, such as automated perception (e.g., computer vision, speech recognition, contextual awareness, etc.), automated cognition (e.g., decision-making, logistics, routing, supply chain optimization, etc.), automated control (e.g., autonomous cars, drones, robots, etc.), among others.

Many ANNs are represented as matrices of weights that correspond to the modeled connections. ANNs operate by accepting data into a set of input neurons that often have many outgoing connections to other neurons. At each traversal between neurons, the corresponding weight modifies the input and is tested against a threshold at the destination neuron. If the weighted value exceeds the threshold, the value is again weighted, or transformed through a nonlinear function, and transmitted to another neuron further down the ANN graph—if the threshold is not exceeded then, generally, the value is not transmitted to a down-graph neuron and the synaptic connection remains inactive. The process of weighting and testing continues until an output neuron is reached; the pattern and values of the output neurons constituting the result of the ANN processing.

The correct operation of most ANNs relies on correct weights. However, ANN designers do not generally know which weights will work for a given application. Instead, a training process is used to arrive at appropriate weights. ANN designers typically choose a number of neuron layers or specific connections between layers including circular connection, but the ANN designer does not generally know which weights will work for a given application. Instead, a training process generally proceeds by selecting initial weights, which may be randomly selected. Training data is fed into the ANN and results are compared to an objective function that provides an indication of error. The error indication is a measure of how wrong the ANN's result was compared to an expected result. This error is then used to correct the weights. Over many iterations, the weights will collectively converge to encode the operational data into the ANN. This process may be called an optimization of the objective function (e.g., a cost or loss function), whereby the cost or loss is minimized A gradient descent technique is often used to perform the objective function optimization. A gradient (e.g., partial derivative) is computed with respect to layer parameters (e.g., aspects of the weight) to provide a direction, and possibly a degree, of correction, but does not result in a single correction to set the weight to a "correct" value. That is, via several iterations, the weight will move towards the "correct," or operationally useful, value. In some implementations, the amount, or step size, of movement is fixed (e.g., the same from iteration to iteration). Small step sizes tend to take a long time to converge, whereas large step sizes may oscillate around the correct value, or exhibit other undesirable behavior. Variable step sizes may be attempted to provide faster convergence without the downsides of large step sizes.

Backpropagation is a technique whereby training data is fed forward through the ANN—here "forward" means that the data starts at the input neurons and follows the directed graph of neuron connections until the output neurons are reached—and the objective function is applied backwards through the ANN to correct the synapse weights. At each step in the backpropagation process, the result of the previous step is used to correct a weight. Thus, the result of the output neuron correction is applied to a neuron that connects to the output neuron, and so forth until the input neurons are reached. Backpropagation has become a popular technique to train a variety of ANNs. Any well known optimization algorithm for back propagation may be used, such as SGD, Adam, etc.

FIG. 2A is a block diagram of an example of an environment including a system for neural network training, according to an embodiment. The system includes an ANN 87 that is trained using a processing node 88. ANN 87 may be implemented as a module and used in conjunction with the combined reward functions. Example modules include convolutional neural networks (CNN) and other types of networks such as ResNet, a type of network that uses residual functions, as well as any other type of network that may be adapted to utilize reward functions. Such neural networks may consist of one or more layers of neurons or synapses in various embodiments. The number of layers may depend on the type of network selected. ResNet may have 50 layers, for example, while other networks may have from a few to a thousand or more. Other CNN structures that may be used include but are not limited to VGG, Inception, and Exception.

The processing node 88 may be a CPU, GPU, field programmable gate array (FPGA), digital signal processor (DSP), application specific integrated circuit (ASIC), or other processing circuitry. In an example, multiple processing nodes may be employed to train different layers of the ANN 87, or even different nodes 89 within layers. Thus, a set of processing nodes 88 is arranged to perform the training of the ANN 87.

The set of processing nodes 88 is arranged to receive a training set 90 for the ANN 87. The ANN 87 comprises a set of nodes 89 arranged in layers (illustrated as rows of nodes 89) and a set of inter-node weights 91 (e.g., parameters) between nodes in the set of nodes. In an example, the training set 90 is a subset of a complete training set. Here, the subset may enable processing nodes with limited storage resources to participate in training the ANN 87.

The training data may include multiple numerical values representative of a domain, such as red, green, and blue pixel values and intensity values for an image or pitch and volume values at discrete times for speech recognition. Each value of the training, or input 92 to be classified once ANN 87 is trained, is provided to a corresponding node 89 in the first layer or input layer of ANN 87. The values propagate through the layers and are changed by the objective function.

As noted above, the set of processing nodes is arranged to train the neural network to create a trained neural network. Once trained, data input into the ANN will produce valid classifications 93 (e.g., the input data 92 will be assigned into categories), for example. The training performed by the set of processing nodes 89 is iterative. In an example, each iteration of the training the neural network is performed independently between layers of the ANN 87. Thus, two distinct layers may be processed in parallel by different members of the set of processing nodes. In an example, different layers of the ANN 87 are trained on different hardware.

ANN 87 may calculate one or more neuron or synapse weights 91 for criteria based upon one or more machine learning algorithms. During training, historical action information representing past actions of the robot may be labeled with an indication of whether the decision made was ultimately successful, in this case, the reward. Thus, the reward, which is based on both robot navigation and the ability to track the object, is used to update the network weights 91. Note that in various networks, initial weights may be pre-set. In other networks, initial weights may be randomized. In one embodiment, a module or processor executing computer instructions to effectuate the neural network learning operations modifies a source neuron's output with a synapse weight to determine the contribution of the source neuron to cause the sink neuron to fire. Practically, in this embodiment, a single and modified value is integrated at the sink neuron in response to the source neuron activation.

FIG. 2B is a block flow diagram illustrating a training stage for a navigation and tracking system 200 of the DRL network. The training stage is shown with three broken line boxes 202, 204, and 206 corresponding to components performing SLAM and Navigation 202, target object detection 204, and DRL 206. The training stage also contains several processing modules to perform methods that will be described utilizing flowcharts in different figures during the description of FIG. 2B.

The training stage includes an input sensing frame $I_t$, shown at 210, which may be data consisting of a video frame of pixels captured by a camera associated with the robot. In one embodiment, video frames may be captured by the sensor 115, which may be a video camera operating at a standard 30 frames per second. Each frame may be referred to as a time window, with successive frames designated by incrementing t by 1. Other frame rates or increments of time may be used in various embodiment. The time increments need not correspond one to one with the frame rate.

At 215, a sensing input frame $X_t$ is shown. A sensing input $X_t$ is a 3D data cube that is generated by stacking part of the pixels of multiple input sensing frames $X_t$ in past time windows together. The sensing input $X_t$ is described in further detail below.

The system 200 during the training stage takes sensing frame $I_t$ 210 at time t from the sensor 115 as input. The sensor 115 can be a video RGB (red, green, blue) camera, an RGBD (RGB disambiguation) sensor, or a depth sensor supported by a mobile robot in one embodiment. In the case of a video RGB camera, the input sensing frame $I_t$ 210 is an RGB image, where each pixel at location $(x_t, y_t)$ in $I_t$ has 3 pixel values $r(x_t, y_t)$, $g(x_t, y_t)$ and $b(x_t, y_t)$ corresponding to the R, G, and B channels, respectively. In the case of an RGBD sensor 115, such as Microsoft Kinect® RGBD sensor, the input sensing frame $I_t$ 210 is an RGBD image, where each pixel at location $(x_t, y_t)$ has not only the three pixel values $r(x_t, y_t)$, $g(x_t, y_t)$ and $b(x_t, y_t)$ corresponding to the R, G, and B channels, respectively, but also a depth value $d(x_t, y_t)$. In the case of a depth sensor 115, such as a laser range sensor, the input sensing frame $I_t$ 210 is a depth image, where each pixel at location $(x_t, y_t)$ has a depth value $d(x_t, y_t)$.

The system 200 determines a six Degree-of-Freedom (6DoF) camera pose and location in a 2D or 3D environment map 220 in a camera localization module 225, based on the input sensing frame $I_t$ 210. The map 220 may be updated at map update module 230. A 6DoF camera pose and location includes a camera rotation $R_{tc}$ and a camera translation $T_{tc}$ at time stamp t in the 3D environment map. For the 2D map, the camera pose and location reduce to a 4DoF rotation and translation on a map plane.

There are multiple different methods the camera localization module 225 may use to compute the camera location. For example, in a 2D map, a particle filtering based method can be used such as the one described in the work of G. Grisetti et al., in the article "Improved techniques for grid mapping with rao-blackwellized particle filters," published in IEEE Transactions on Robotics, 23:34-46, 2007, to compute the 4DoF camera location $T_t$ and pose $R_t$ based on the input frames $I_{t-1}$ and $I_t$, and the past camera location $T_{t-1}$ and pose $R_{t-1}$.

Figure 3:
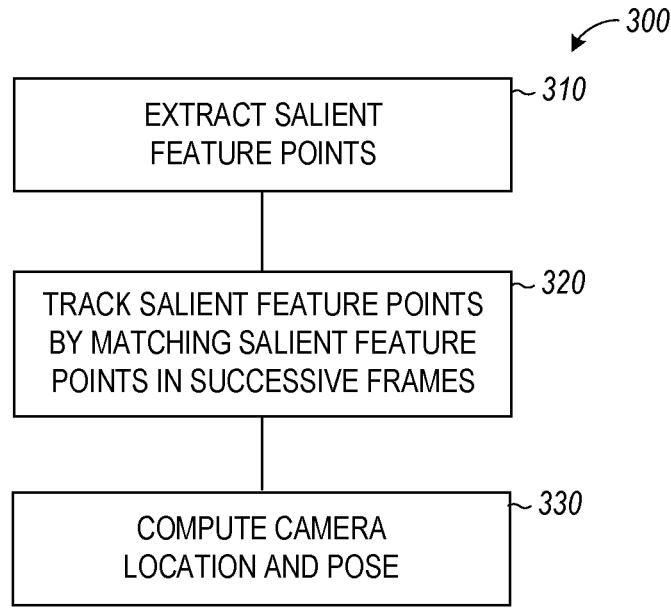
FIG. 3 is a flowchart illustrating a method of camera localization according to an example embodiment.

In a 3D map, when RGB images are used, a camera localization method 300 as indicated in a flowchart in FIG. 3 may be implemented by camera localization module 225 to localize the camera. Method 300 extracts at operation 310, salient feature points such as corner points from frame $I_{t-1}$, which are then tracked at operation 320 in frame $I_t$ by, for example, matching to salient feature points computed from frame $I_t$. Based on such tracked set of feature points in the two frames, as well as the past camera pose $R_{t-1}$ and location $T_{t-1}$ of the robot system in the 3D map, the 6DoF camera location $T_t$ and pose $R_t$ can be computed at operation 330, for example, the method described in the work of G. Klein and D. Murray, in the article "Parallel tracking and mapping on a camera phone," published in Proc. International Symposium on Mixed and Augmented Reality, 2009.

Figure 4:
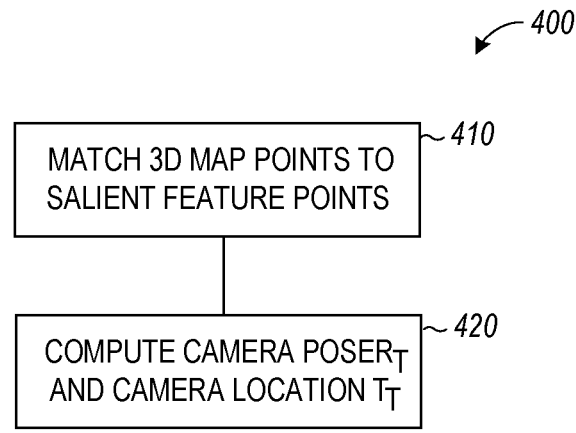
FIG. 4 is a flowchart illustrating a further method of camera localization according to an example embodiment.

In some cases, such camera localizations are insufficient to properly track features between frames $I_{t-1}$ and $I_t$, and the computed camera location can be unstable. In such cases, additional steps may be used to compute $R_t$ and $T_t$, such as the re-localization method 400 illustrated in flowchart form in FIG. 4 that may be implemented by camera localization module 225. In method 400, the 3D map points are matched at operation 410 to the salient feature points computed such as at operation 310 from frame $I_t$, and based on the 2D-3D matched points the Perspective-n-Point (PnP), can be used to compute $R_t$ and $T_t$, at operation 420 as described in V. Lepetit et al., "EPnP: An Accurate O(n) Solution to the PnP Problem," International Journal of Computer Vision 81 (2): 155-166.

Various methods can be used to find the 2D-3D matched points based on the computed distances between the descriptors of the 2D salient feature points computed from frame $I_t$ and the descriptors of the 3D points, such as the brute force nearest neighbor matching or the fast approximate nearest neighbor matching.

Figure 5:
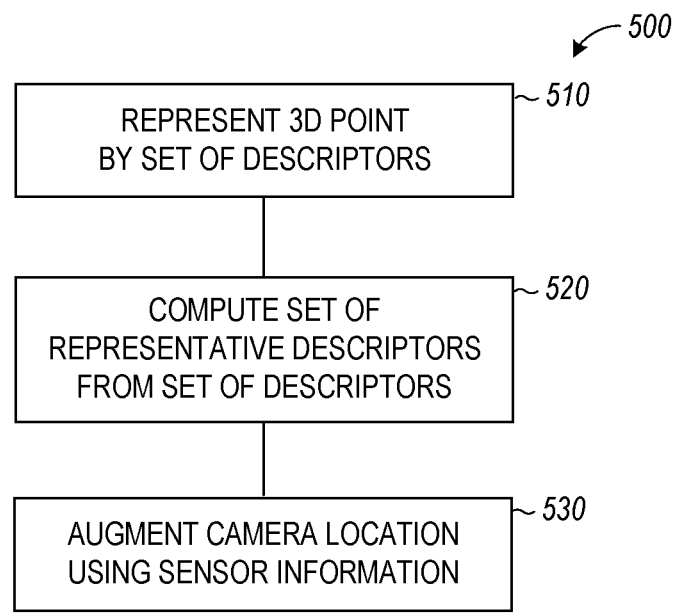
FIG. 5 is a flowchart illustrating a method of computing descriptors of 3D points according to an example embodiment.

There are also various ways to compute the descriptors of the 3D points as illustrated in flowchart form in FIG. 5 showing method 500. For example, a 3D point can be simply represented by a set of descriptors at operation 510 comprising the descriptors of the 2D salient feature points that triangulates to obtain the 3D point, and the descriptors of the salient feature points that match to the 3D point in the following frames. Also, a set of representative descriptors can be computed at operation 520 from this set of descriptors, e.g., through clustering methods, to represent the 3D point. Various types of descriptors can be used, such as the Scale-Invariant Feature Transform (SIFT) descriptor, Speeded UP Robust Features (SURF) descriptor, Oriented Features from Accelerated Segment Test (FAST) and Rotated Binary Robust Independent Element Features (BRIEF) (ORB) descriptor, etc.

In some special cases where not enough good points can be computed from the frame $I_{t+1}$, additional inputs 530 from inertial motion sensors such as gyroscope, accelerometer, etc. can be used to help with robust camera localization. In a 3D map, when the depth information can be obtained from a depth sensor, the 3D points can be registered between frame $I_{t-1}$ and frame $I_t$, and between frame $I_t$ and the 3D map, and such 3D-3D correspondences can be used for camera localization. Many different camera localization methods may be used in various embodiments.

Figure 6:
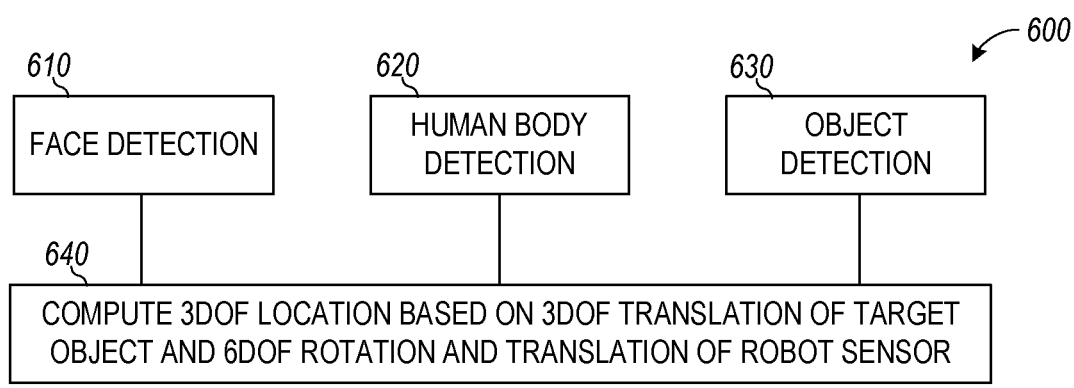
FIG. 6 is a flowchart illustrating a method of determining a 3DoF location of a target object according to an example embodiment.

At the same time, the system determines, based on the input sensing frame $I_t$, a 3DoF (three degrees of freedom—$X_{t0}$, $Y_{t0}$, $Z_{t0}$) location 235 of the target object for tracking in the 2D or 3D environment map may be calculated using a target localization module 240. There can be multiple ways to determine the 3DoF location of the target object for tracking as illustrated in flowchart form in FIG. 6 showing method 600. For example, a face detection and identification module can be used to determine at operation 610, in the input sensing frame $I_t$, the location $(x_{t0}, y_{t0})$ of the object if the target object is a human face, or a human body detection and identification module can be used at operation 620 to determine the location $(x_{t0}, y_{t0})$ of the object if the target object is a human body, or an object detection and identification module can be used 630 to determine the location $(x_{t0}, y_{t0})$ of the object for a general target object.

Based on the location $(x_{t0}, y_{t0})$ of the input sensing frame $I_t$, a 3D location $(X_{t0}, Y_{t0}, Z_{t0})$ can be determined in a 2D or 3D environment map ($Z_{t0}=0$ for a 2D map) for the target object. There are multiple ways to determine the 3D location $(X_{t0}, Y_{t0}, Z_{t0})$ based on the location $(x_{t0}, y_{t0})$ of the target object. For example, the 3DoF translation $T'_{t0}$ of the target object relative to the robot sensor 115 can be directly computed based on the sensor 115 parameters, the location $(x_{t0}, y_{t0})$, and the depth sensing frame if a depth sensor 115 is used or visual feature matching if a depth sensor 115 is not used. Based on the 3DoF translation $T'_{t0}$ of the target object and the 6DoF rotation $R_{tc}$ and translation $T_{tc}$ of the robot sensor in the environment map, the 3DoF location $(X_{t0}, Y_{t0}, Z_{t0})$ can be computed 640 through geometric derivation.

Figure 7:
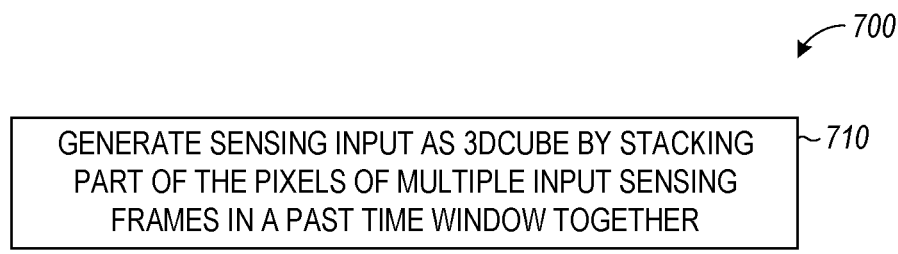
FIG. 7 is a flowchart illustrating a method of generating a sensing input from multiple sensing frames over time according to an example embodiment.

Based on the input sensing frame $I_t$ and the 3D location of the target object $(X_{t0}, Y_{t0}, Z_{t0})$, the system 200 continues to generate the sensing input $X_t$ 215 as further illustrated in flowchart form at 700 in FIG. 7. In one embodiment, the sensing input $X_t$ 215 is a 3D data cube that is generated by processing resources in operation 710 by stacking part of the pixels of multiple input sensing frames in a past time window together. For example, the sensing input $X_t$ 215 can be of shape W×H×J, where each j-th channel is a 2D matrix of shape W×H, each item in the matrix corresponding to a pixel at a location in the input sensing frame $I_{t-j+1}$ and the value of this item being a weighted combination of the pixels from different input channels (RGB, depth, or RGB and depth) at that location. W and H can be the width and height of the original sensing frame $I_t$, or then can be the width and height of a cropped image from the original sensing frame $I_t$ centered around the target object to track.

The training stage of the system 200, based on the sensing frame $I_t$, the location $(x_{t0}, y_{t0})$ of the target object in the sensing frame $I_t$, and the 3D location $(X_{t0}, Y_{t0}, Z_{t0})$ of the target object in the map, computes rewards using a compute reward module 245 which is part of a deep reinforcement learning (DRL) network indicated by broken line 206.

Figure 8:
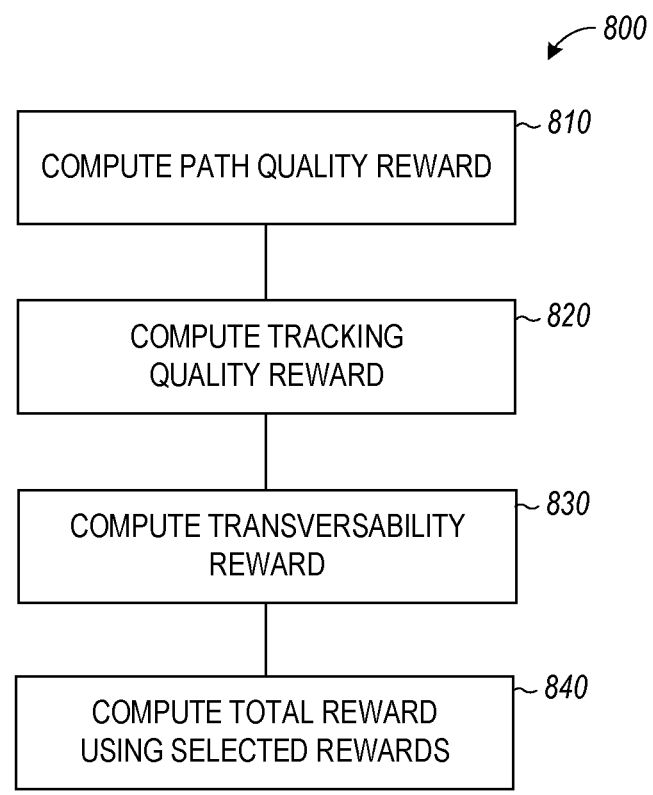
FIG. 8 is a flowchart illustrating a method of computing multiple rewards corresponding to navigation and object tracking in a DRL network according to an example embodiment.

A method 800 performed by the DRL network is shown in FIG. 8 in flowchart form. In one embodiment, three types of rewards may be computed and used to train the DRL network 206. A path quality reward $r_p$ is computed at operation 810 to encourage effective navigation paths. In one embodiment, $r_p$ is defined as a function $F_p$, e.g., $F_p(D) = -\log(D)$, where D is the shortest valid distance between the target object 135 and the robot 110 in the 2D or 3D map 220, i.e., the length of the shortest valid path between the target object and the robot based on the 2D or 3D map. $r_p$ encourages the robot system to move towards the target object. If no valid path exists, i.e., the robot 110 can no longer reach the target object, a negative value $r_{negative}$ may be used as $r_p$ as a punishment. Function $F_p$ can take various forms, preferably transferring the input distance to a similarity value between 0 and 1. The negative value is simply used to decrease the value of the reward where the path of the robot makes it more difficult to track the target object.

A tracking quality reward $r_k$ may be computed at operation 820 by compute reward module 245 to encourage consistent object tracking. In one embodiment, $r_k$ may be defined as follows:

$$r_k = \frac{\text{Size(observed)}}{\text{Size(object)}} \cdot \frac{\text{Dist}(x_{t0} - C_{tx})}{L_{tx}} \cdot \frac{\text{Dist}(y_{t0} - C_{ty})}{L_{ty}}$$

where Size(object) and Size(observed) are the sizes, in terms of pixel numbers, of the object 135 and the actually observed portion of the object 135, respectively. Term $$\frac{\text{Size(observed)}}{\text{Size(object)}}$$

encourages the system 200 to observe the whole object 115 for effective tracking, and punishes for cases such as occlusions or being too close to the tracked object 115 where the robot system cannot observe the full object. $C_{tx}$ and $C_{ty}$ are the ideal horizontal and vertical location in the input sensing frame $I_t$ 210 that one would like the target object 115 to be. $L_{tx}$ and $L_{ty}$ are the corresponding normalization factors. Dist is a distance measurement. For example, $C_{tx}$ and $C_{ty}$ can be the center of the frame $I_t$ 210, $\text{Dist}(x_{t0}-C_{tx})$ and $\text{Dist}(y_{t0}-C_{ty})$ can be the number of pixels between $x_{t0}$ and $C_{tx}$ and between $y_{t0}$ and $C_{ty}$, and $L_{tx}$ and $L_{ty}$ can be the width and height of the frame $I_t$ 210 respectively. Reward $r_k$ overall encourages that the robot system observes the full body of the target object to track at a good viewing angle.

The compute reward module 245 may also compute a traversability reward $r_v$ at operation 830 to avoid dynamic obstacles. In one embodiment, the traversability reward $r_v$ is defined as a function of the average distance between the robot system and the potential obstacles in the 2D or 3D map, $r_v = F_v(\text{average}_{T_m \in \Omega}\{\text{Dist}(T_{t+1}, T_m)\})$, where Dist is a distance measurement between the robot and obstacle, such as Euclidean distance measurement, and $T_m \in \Omega$, where $T_m$ is a subset of the whole set of map points representing the surface of an obstacle or wall and are within a distance threshold to $T_{t+1}$. There are various ways to determine the set of map points $T_m \in \Omega$. For example, $T_m \in \Omega$ can be the map points whose Truncated Signed Distance Function (TSDF) has zero values and are within a certain distance threshold defined by the Dist measurement with the robot system location $T_{t+1}$. $r_v$ encourages the robot system to avoid bumping into obstacles and walls. Function $F_v$ can take various forms, preferably transferring the input distance to a similarity value between 0 and 1. For example, $F_v$ can be $F_v(D) = -\log(D)$.

The total reward $r_t$ at 255 may be computed at operation 840 as the combination, such as by simple addition or weighted addition where selected rewards may be more important than others, of $r_p$, $r_k$, and $r_v$:

$$r_t = \alpha r_p + \beta r_k + \gamma r_v$$

where $\alpha$, $\beta$, and $\gamma$ are the corresponding weights. In some embodiments, less than all three rewards may be selected for calculating the total reward 255. For example, where fewer obstructions appear in the environment, the traversability reward may be excluded or weighted much less than the other rewards.

DRL network 206 also includes a module 260 that computes target $y_k$ and loss $L_k$, a module 265 that updates the DRL network with $L_k$, DRL Network $N_k$ 270 (such as ANN 87), action selection module 275, and the selected action at 280, described in further detail below. Note that $N_k$ is a network in training, which is being updated. After the network is trained, the final network will be fixed.

In some embodiments, when a map is not completely pre-known, the system 200 may also update the 2D or 3D map 220 in the training stage, based on $R_{t-1}$, $T_{t-1}$, $R_t$, $T_t$, and the 2D-2D point correspondences found between the sensing frame $I_{t-1}$ and $I_t$ 210 and/or the 2D-3D point correspondences found between the sensing frame $I_t$ 210 and the 3D map 220. For example, for each existing 3D point in the 3D map 220, if a 2D salient feature point is matched to that particular 3D point, the descriptor of the matching 2D salient feature point is used to update the descriptor representation of the 3D point.

In some embodiments, the 3D location of the 3D point is also updated based on the new matching 2D salient feature point. There are various ways to perform such an update. For example, a candidate 3D location can be triangulated using each pair of 2D keypoints corresponding to the 3D point, and the final 3D location of the 3D point can be some statistics (e.g., statistical mean) computed from these candidates. New 2D or 3D map points are also added into the existing 2D or 3D map 220. For different sensing systems, such as one based on RGB, RGBD, or Depth sensors, different processes may be used for adding new Map points.

2D and 3D maps for use with different sensing system may be updated using different methods. For example, for a depth sensor, a particle filtering based method can be used for 2D map update as described in in the work of G. Grisetti et al., in the article "Improved techniques for grid mapping with rao-blackwellized particle filters," published in IEEE Transactions on Robotics, 23:34-46, 2007. For an RGB sensor, triangulation methods can be used for 3D map update. Other methods may be used with various different sensors in further embodiments.

Figure 9:
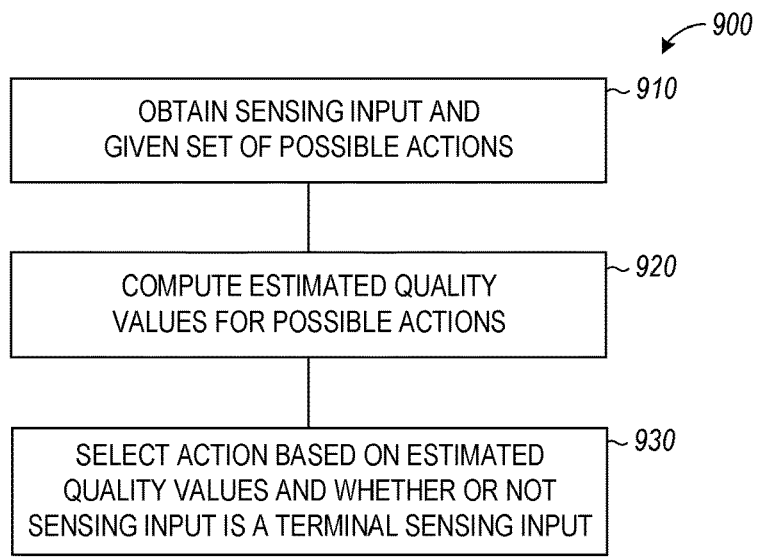
FIG. 9 is a flowchart illustrating a method of determining an action by the robot using a trained DRL network according to an example embodiment.

FIG. 9 illustrates a method 900 for determining an action by the robot in flowchart form. Method 900 may be implemented by the DRL Network $N_k$ 270 during training in FIG. 2B. Given the sensing input $X_t$ at a time stamp t, and given a set operation of m possible actions $a_{t1}, \ldots, a_{tm}$ of the robot system at the time stamp t as indicated at operation 910, the DRL network $N_k$ 270 computes at operation 920 the estimated Q-values for all these possible actions $Q(a_{t1}, X_t), \ldots, Q(a_{tm}, X_t)$, in a feedforward fashion. The Q-value measures the quality of each possible action, and each Q-value $Q(a_{ti}, X_t)$ is a number (floating or integer) as an output computed by the DRL network $N_k$.

The goal is that after training, the DRL network $N_k$ is able to compute Q-values for possible actions at each time stamp t, and the action with the maximum Q-value will implicitly maximize the corresponding rewards that are used in the training process. The possible actions $a_{t1}, \ldots, a_{tm}$ are defined based on discretization of the possible moving directions in the 2D or 3D coordinates in the 2D or 3D environment map. For instance, in a 2D map, the current 4DoF location $T_t$ and pose $R_t$ denote the 2D coordinate and orientation of the robot system at time t in the 2D map, and m possible moving actions can be obtained by discretizing the 2D space on the 2D mapping plane.

For example, the possible actions can have two degrees of freedom, moving direction and moving step, where moving direction can be $\varphi, 2\varphi, \ldots, h\varphi$, and moving step can be $\mu, 2\mu, \ldots, l\mu$, and $l \times h = m$. Each combination of moving direction and moving step corresponds to one possible action for the robot to move Similarly, in a 3D map, the current 6 DoF location $T_t$ and pose $R_t$ denote the 3D coordinate and orientation of the robot system at time t, and m possible moving actions can be obtained by discretizing the 3D space. For example, one can discretize the z axis first to obtain a few planes, and in each plane, the 2D plane can be discretized similar to the above mentioned method.

Based on the estimated Q-values for all these possible actions $Q(a_{t1}, X_t), \ldots, Q(a_{tm}, X_t)$, the action selection 275 selects at operation 930 an action $a_t$ 280 for time t. Usually an $\varepsilon$-greedy method is preferred here, where with probability $\varepsilon$ a random action $a_t$ is selected, and with possibility $1-\varepsilon$, the optimal action $a_t$ with maximum Q-value is selected:

$$a_t = \arg\max_{a_{ti}} Q(a_{ti}, X_t)$$

Then the robot system executes the action $a_t$ 280 at module 285 by moving itself according to the moving direction and step defined by action $a_t$. After that, a new sensing frame $I_{t+1}$ 210 can be obtained from the sensor at time t+1, and the system 200 will iterate the above steps.

Figure 10:
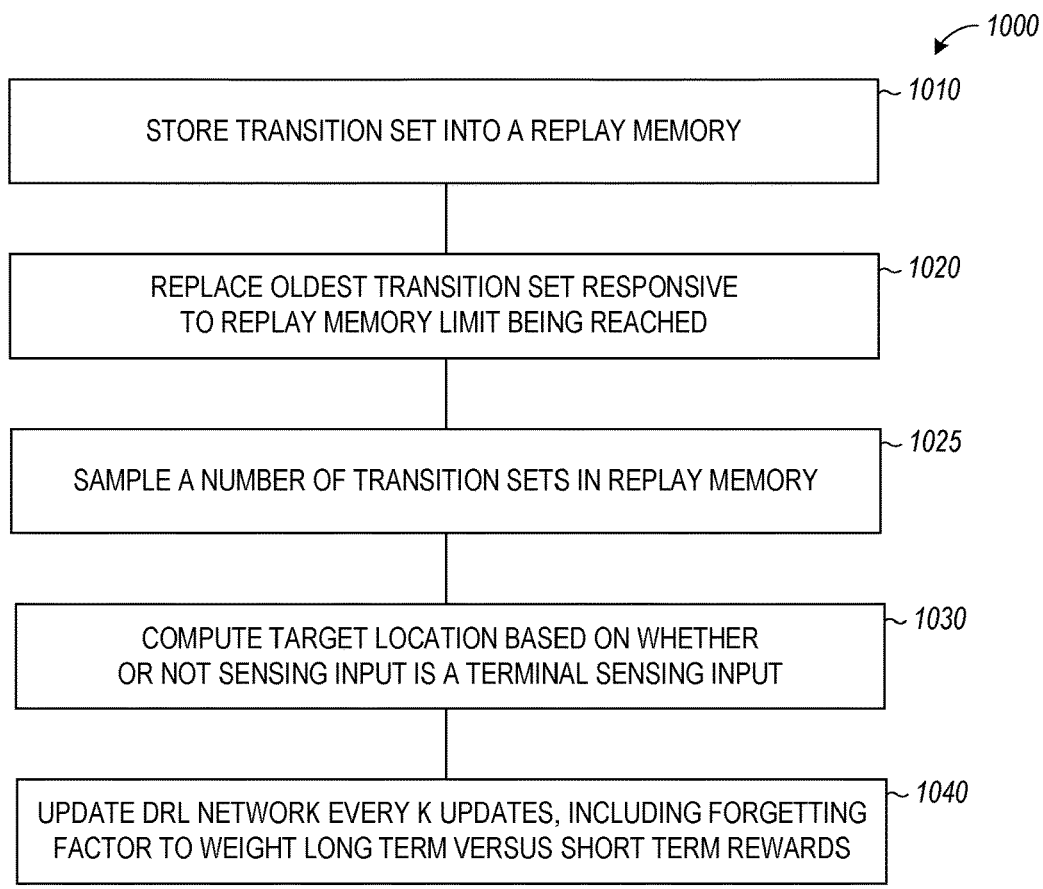
FIG. 10 is a flowchart illustrating a method of updating a DRL network using a replay memory according to an example embodiment.

In the training stage, the system 200 updates the DRL network $N_k$ 270 at a frequency of every K time stamps, $K \geq 1$. There are multiple ways to update the DRL network. In one embodiment illustrated in flowchart form in FIG. 10 by method 1000, the system 200 stores at operation 1010 the transition set $(X_t, a_t, r_t, X_{t+1})$ into a replay memory R. The replay memory R normally has a storage limit, and once the storage limit has been reached, the oldest transition set will be replaced at operation 1020 by the newly added transition set.

For the k-th update of the DRL network, the robotic device aims to update the DRL network from $N_{k-1}$ to $N_k$. The robotic device first randomly samples at operation 1025 a number of transition sets from the replay memory R and then, for each transition set $(X_j, a_j, r_j, X_{j+1})$, the robot computes at operation 1030 a target $y_j$ using the current DRL network $N_{k-1}$ by:

$$y_j = r_j + \eta \max_a Q(a, X_{j+1}),$$

if $X_j$ is not a terminal sensing input which is the last frame saved in the replay memory R. The target $y_j$ is expressed by:

$$y_j = r_j,$$

if $X_j$ is a terminal sensing input. Target $y_j$ is a computed target Q-value after taking an optimal action at time stamp j. The computed target Q-value is computed as the current reward plus an estimated optimal Q-value after observing the new sensing frame $X_{j+1}$ determined by the current network $N_{k-1}$ with parameters $\theta_k$.

The parameter $\eta$ is the forgetting factor valued between 0 and 1 and determines how important the system weights long-term rewards against short-term ones. The smaller the forgetting factor, the robotic device weights less on long-term rewards but cares only for the short-term rewards. If the forgetting factor is closer to 1, the robotic device tends to treat long-term rewards similarly with the short-term rewards. At operation 1040, the DRL network is updated every K timestamps from $N_{k-1}$ to $N_k$.

A target loss calculated at module 260 may be used to update the parameters in the DRL network $N_k$ at module 265. $Q(a_j, X_j)$ is the Q-value computed by a target network N' by taking the actual action $a_j$ in the transition set with the input $X_j$, and $y_j$ is the target Q-value that one hopes an updated DRL network 270 will generate at time stamp j. The target network N' is basically the same as the DRL network $N_k$ 270. The only difference is that the target network N' is updated more slowly than the DRL network $N_k$ 270. In other words, the DRL network $N_k$ is copied to the target network N' after every M updates. M is a parameter to tune empirically, and in one example, is set to 10, but may be higher or lower than 10 in further embodiments. If M is set to 1, network N' may but updated every time Network $N_k$ is updated. Network stability increases when M increases, but the speed at which the network learns may slow down, and the network may converge prematurely. Thus, the value of M is a tradeoff between stability, learning speed, and convergence.

The use of the target network N' is to help stabilize the updates of the DRL network. The robot 110 computes the target loss, represented by $L_j$, at 260 by:

$$L_j = (y_j - Q(a_j, X_j))^2$$

and computes the gradient of $L_j$ by:

$$\nabla_{\theta_k} L_j = E\{(y_j - Q(a_j, X_j)) \nabla_{\theta_k} Q(a_j, X_j)\}$$

where $\theta 9_k$ are parameters in DRL network $N_{k-1}$. The DRL network $N_{k-1}$ is updated into $N_k$ by performing a gradient descent step through backward propagation based on the gradient of $L_j$. In one embodiment, the expectation of the gradient of $L_j$ is computed by statistical methods (e.g., stochastic gradient descent (SGD)).

Once updated, DRL network $N_k$ 270 is used for action selection 275 and selects action $a_t$ 280. The action $a_t$ is then executed at 285, causing the robot 110 to move responsive to the selected action. A new input sensing frame 210 is then received from the sensor 115 and the process repeats. Note that when using a simulated environment to train, the execution of the action 285 and sensing corresponds to the simulated environment and no actual physical movement of the robot need occur.

After training, in the testing stage and operating stage as shown by system 1100 in the block flow diagram of FIG. 11, the robot 115 can effectively conduct simultaneous navigation and object tracking with the help of the trained DRL network N 1110 (such as ANN 87) obtained from the training process represented in FIG. 2B to select an effective navigation path, consistently track the target object 135, and avoid dynamic obstacles. Specifically, the system 1100 takes as input a sensing frame $I_t$ 210 at time t from the sensor 115 that is the same type of sensor as used in the training stage, which can be a video RGB camera, a RGBD sensor, or a depth sensor for example. Note that blocks in FIG. 11 are labeled with the same reference number as similar blocks in FIG. 2B.

Given the input sensing frame $I_t$ 210 at a time stamp t, the system 1100 first determines the 6DoF camera pose and location in a 2D or 3D environment map 220 in the Camera Localization module 225. At the same time, the system determines, based on the input sensing frame $I_t$, 210 the 3DoF location of the target object 135 for tracking in the 2D or 3D environment map in the Target Localization module 240. After that, based on the input sensing frame $I_t$ 210 and the 3D location of the target object ($X_{t0}, Y_{t0}, Z_{t0}$), the system continues to generate a sensing input $X_t$ 215 in the same way as in the training stage.

Then given a set of m possible actions $a_{t1}, \ldots, a_{tm}$ of the robot system at the time stamp t, the DRL network N computes the estimated Q-values for all these possible actions $Q(a_{t1}, X_t), \ldots, Q(a_{tm}, X_t)$, in a feedforward fashion. The possible actions $a_{t1}, \ldots, a_{tm}$ are defined based on discretization of the possible moving directions in the 2D or 3D coordinates in the 2D or 3D environment map, in the same way as in the training process. Based on the estimated Q-values for all these possible actions $Q(a_{t1}, X_t), \ldots, Q(a_{tm}, X_t)$, the action selection 275 process selects an action $a_t$ 280 for time t. An ε-greedy method may be used where with probability ε, a random action $a_t$ 280 is selected, and with possibility 1−ε, the optimal action $a_t$ with maximum Q-value is selected:

$$a_t = \arg\max_{a_n} Q(a_{ti}, X_t)$$

The robot executes the action $a_t$ at 285 by moving itself according to the moving direction and step defined by action $a_t$. After that, a new sensor frame $I_{t+1}$ can be obtained from the sensor at time t+1, and the system proceeds to the next time stamp.

Figure 12:
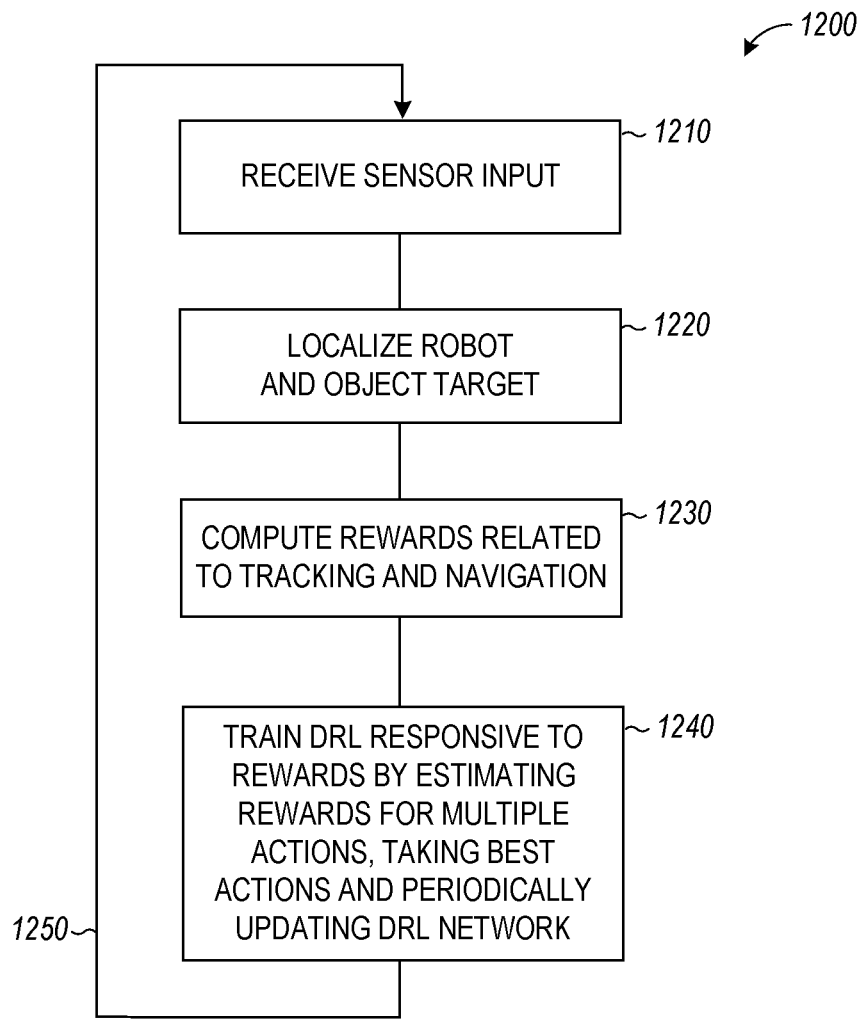
FIG. 12 is a flowchart illustrating a method of training a robot to track a target object and navigate to avoid obstacles while still ensuring the ability to track the target object according to an example embodiment.

FIG. 12 is a flowchart illustrating a method 1200 of training a robot to track a target object and navigate to avoid obstacles while still ensuring the ability to track the target object. The robot may use a camera and/or other sensors for tracking the target object. In some embodiment, the obstacles may be dynamic, in that the obstacles may also move.

Method 1200 may begin at operation 1210 by receiving tracking sensor input representing the object and the environment at multiple times.

Method 1200 in one embodiment may be executed by processing resources integrated with the robot, or remote processing resources communicating with the robot. At operation 1220, responsive to the tracking sensor input, method 1200 calculates positions of the robot and the object at the multiple times.

At operation 1230, using a trained deep reinforcement learning (DRL) network responsive to the calculated positions of the robot and the object at the multiple times to estimate tracking quality rewards and robot navigation path quality rewards for a set of possible actions specifying movement of the object tracking robot, and at operation 1240, determine an action from the set of actions specifying movement of the object tracking robot via the DRL network that has been trained as a function of the estimated object tracking quality rewards and robot navigation path quality rewards. At return 1250, method 1200 repeats the operations for each new position of the robot. The positions of the robot and target may be calculated via a simulation to train the DRL network faster than is possible with training in a real environment.

In further embodiments, a traversability quality reward may be estimated and used in conjunction with the other quality rewards to train the DRL network. The quality rewards may be weighted in some embodiments. A forgetting factor may also be used to emphasize long term versus short term rewards.

The tracking sensor input may be RGB image based in some embodiments, and may include other types of sensors, such as depth sensors or inertial motion sensors such as gyroscope, accelerometer, etc., to augment the calculation of positions of the robot and object.

Figure 13:
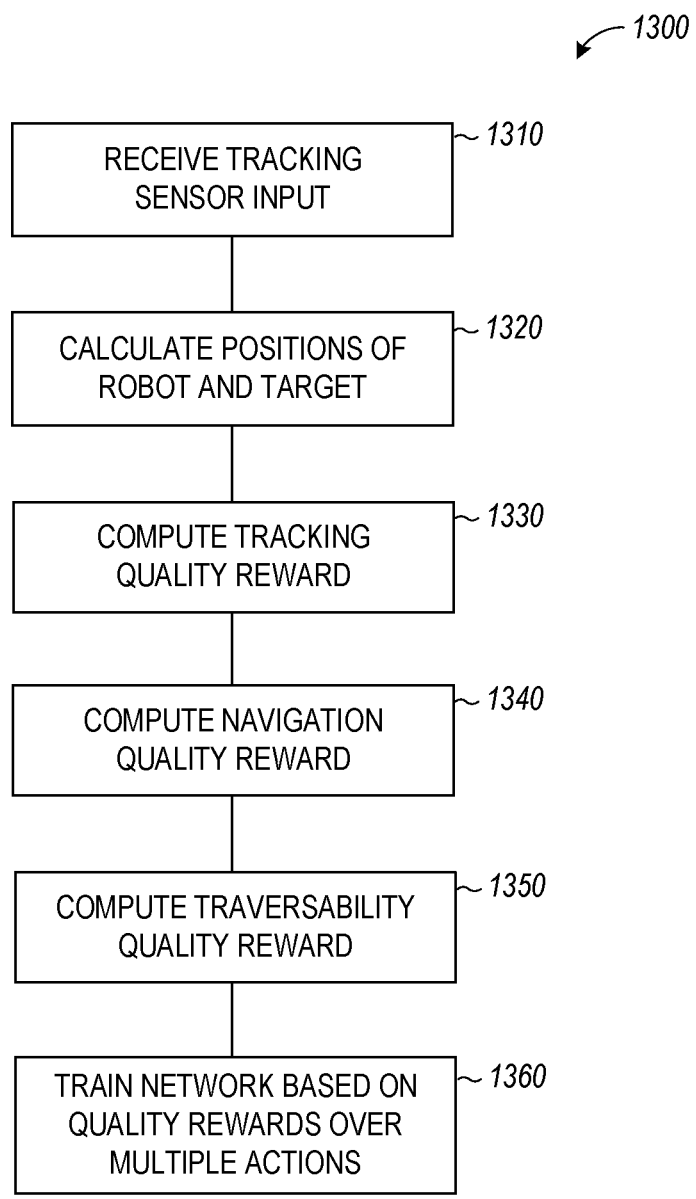
FIG. 13 is a flowchart illustrating a method of training a deep reinforcement learning (DRL) network to track an object and navigate a robot in an environment according to an example embodiment.

FIG. 13 is a flowchart illustrating a method 1300 of training a deep reinforcement learning (DRL) network to track an object and navigate a robot in an environment. Method 1300 includes receiving at operation 1310 tracking sensor input representing the object and the environment at multiple times. Responsive to the tracking sensor input, positions of the robot and the object are calculated at operation 1320 at the multiple times. At operation 1330, a tracking quality reward is calculated as a function of maintaining consisting object tracking at the multiple times. At operation 1340, a navigation path quality reward is calculated as a function of an effective navigation path. The DRL network is trained at operation 1360 responsive to the tracking quality reward and navigation path quality reward over multiple actions of moving the robot.

In further embodiments, a traversability quality reward may be estimated at operation 1350 and used in conjunction with the other quality rewards to determine the action. The quality rewards may be weighted in some embodiments. A forgetting factor may also be used to emphasize long term versus short term rewards.

The tracking sensor input may be RGB image based in some embodiments, and may include other types of sensors, such as depth sensors or inertial motion sensors such as gyroscope, accelerometer, etc., to augment the calculation of positions of the robot and object.

In some embodiments, method 1300 may be implemented on processing resources integrated into robot 115 to control the navigation and tracking functions of the robot 115.

A DRL assisted object tracking and navigation system for moving robots actively decides how the robot moves to effective track a target moving object, and at the same time, navigates through an environment map. By training a DRL network using previous real-world and simulated object tracking sessions, the system can effectively conduct simultaneous navigation and object tracking in a new dynamic environment with the help of the trained DRL network to select an effective navigation path, consistently track the target object, and avoid dynamic obstacles.

Three types of reward functions may be used for the system to learn experiences from the previous tracking sessions. A path quality reward encourages effective navigation paths. A tracking quality reward encourages consistent object tracking. An optional traversability reward may be included to avoid dynamic obstacles.

The system is generic and flexible in terms of applicability to the various types of robotic systems using different algorithms and hardware configurations, such as using 2D or 3D maps, using RGB, RGBD, or depth sensors. The system is generic and flexible in terms of applicability to the various types of target tracking objects, such as face, people, or general object, where various types of target localization (detectors) can be incorporated.

The system is flexible in terms of the structure and component of the DRL networks. Various DRL networks with discrete action space can be used in the system.

Figure 14:
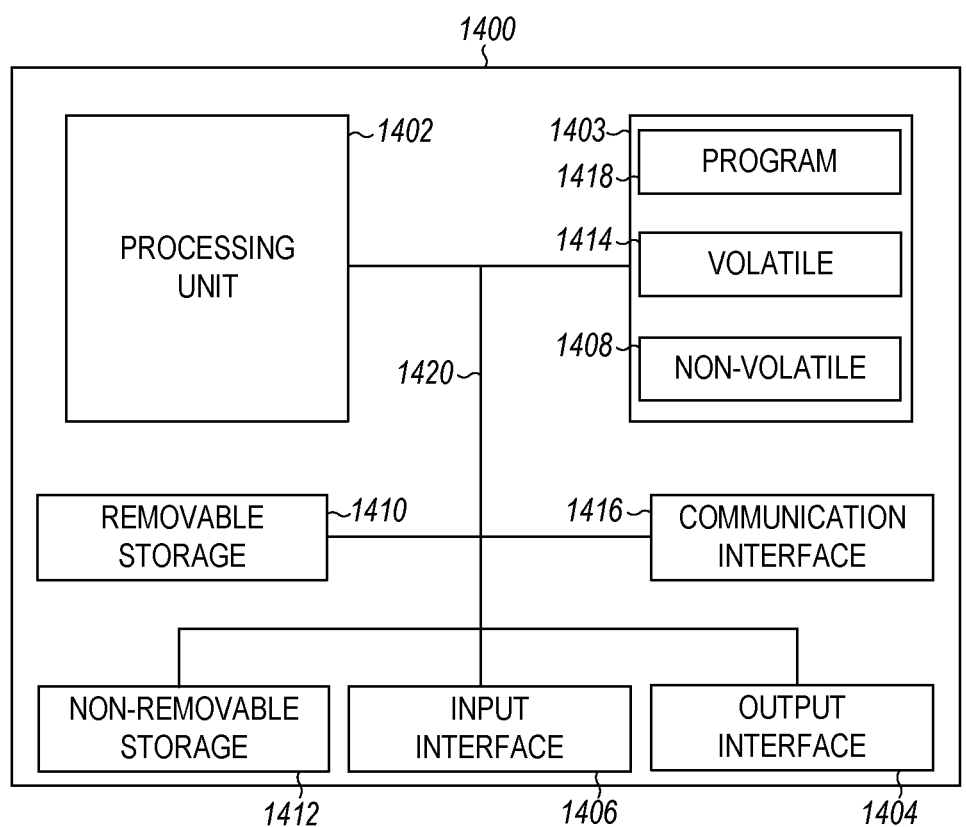
FIG. 14 is a block diagram illustrating processing resources for performing methods and algorithms according to example embodiments.

FIG. 14 is a block diagram illustrating processing resources such as circuitry and programming for training a DRL network for performing navigation for the robot while tracking an object and for implementing procedures and performing methods according to example embodiments. All components need not be used in various embodiments. For example, the circuitry used for training may be a more powerful computer that can also execute a simulation of an environment in which the robot may be utilized, while the robot may include a less powerful version of the circuitry for actually controlling the navigation and tracking functions of the robot.

One example computing device in the form of a computer 1400 may include a processor or processing unit 1402, memory 1403, removable storage 1410, and/or non-removable storage 1412. Although the example computing device is illustrated and described as computer 1400, the computing device may be in different forms in different embodiments. For example, the computing device may instead be a smartphone, a tablet, smartwatch, or other computing device including the same or similar elements as illustrated and described with regard to FIG. 14. Devices, such as smartphones, tablets, and smartwatches, are generally collectively referred to as mobile devices or user equipment. Further, although the various data storage elements are illustrated as part of the computer 1400, the storage may also or alternatively include cloud-based storage accessible via a network, such as the Internet or server based storage.

Memory 1403 may include volatile memory 1414 and/or non-volatile memory 1408, either of which may provide the replay memory R described above. Computer 1400 may include—or have access to a computing environment that includes—a variety of computer-readable media, such as volatile memory 1414 and/or non-volatile memory 1408, removable storage 1410 and/or non-removable storage 1412. Computer storage includes random access memory (RAM), read only memory (ROM), erasable programmable read-only memory (EPROM), electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 1400 may include or have access to a computing environment that includes input 1406, output 1404, and a communication connection or interface 1416. Output 1404 may include a display device, such as a touchscreen, that also may serve as an input device. The input 1406 may include one or more of a touchscreen, touchpad, mouse, keyboard, camera, one or more device-specific buttons, one or more sensors integrated within or coupled via wired or wireless data connections to the computer 1400, and other input devices. The computer may operate in a networked environment using a communication connection to connect to one or more remote computers, such as database servers. The remote computer may include a personal computer (PC), server, router, network PC, a peer device or other common network node, or the like. The communication connection may include a cable network, Local Area Network (LAN), a Wide Area Network (WAN), cellular, WiFi, Bluetooth, or other networks.

Computer-readable instructions stored on a computer-readable medium are executable by the processing unit 1402 of the computer 1400. A hard drive, CD-ROM, and RAM are some examples of articles including a non-transitory computer-readable medium such as a storage device. The terms computer-readable medium and storage device do not include carrier waves to the extent carrier waves are deemed too transitory. For example, a computer program 1418 may be used to cause processing unit 1402 to perform one or more methods or algorithms described herein.

EXAMPLES

In example 1, a method of tracking an object and navigating an object tracking robot includes receiving tracking sensor input representing the object and an environment at multiple times, responsive to the tracking sensor input, calculating positions of the robot and the object at the multiple times, and using a computer implemented deep reinforcement learning (DRL) network trained as a function of tracking quality rewards and robot navigation path quality rewards, the DRL network being responsive to the calculated positions of the robot and the object at the multiple times to determine possible actions specifying movement of the object tracking robot from a current position of the robot and target, determine quality values (Q-values) for the possible actions, and select an action as a function of the Q-values.

Example 2 includes the method of example 1 wherein the tracking quality rewards are a function of a size of the object observed divided by the size of the object and a distance of the object from the object tracking robot.

Example 3 includes the method of any of examples 1-2 wherein the tracking quality rewards, $r_k$, are calculated in accordance with the following equation:

$$r_k = \frac{\text{Size(observed)}}{\text{Size(object)}} \cdot \frac{Dist(x_{t0} - C_{tx})}{L_{tx}} \cdot \frac{Dist(y_{t0} - C_{ty})}{L_{ty}}$$

where Size(object) and Size(observed) are sizes, in terms of pixel numbers, of the object and the actually observed portion of the object respectively, $C_{tx}$ and $C_{ty}$ an ideal horizontal and vertical location in an input sensing frame $I_t$, $L_{tx}$, and $L_{ty}$, are normalization factors, $x_{t0}$ and $y_{t0}$ are a location of the object, and Dist is a distance measurement to the object.

Example 4 includes the method of any of examples 1-3 wherein robot navigation path quality rewards, rp, are defined as a function of the shortest valid distance between the object and the robot.

Example 5 includes the method of any of examples 1-4 wherein the DRL network is further trained as a function of a traversability quality reward rv for the set of possible actions specifying movement of the object tracking robot.

Example 6 includes the method of example 5 wherein the traversability quality reward rv is defined as a function of an average distance between the object tracking robot and potential obstacles.

Example 7 includes the method of example 6 wherein the robot and object reside in the environment that is represented by a map, and the traversability quality reward $r_v = F_v(\text{average}_{T_m \in \Omega}\{Dist(T_{t+1}, T_m)\})$, where Dist is a distance measurement between the robot and obstacle and $T_m \in \Omega$ are a set of map points that represents a surface of an obstacle or wall and are within a distance threshold to Tt+1.

Example 8 includes the method of any of examples 5-7 wherein the quality rewards are weighted.

Example 9 includes the method of any of examples 1-8 wherein the sensing input comprises RGB image frame pixels, and further includes creating a sensing input by stacking pixels of multiple input sensing image frames in a past time window together, and wherein the DRL network uses the sensing input to estimate rewards and determine actions.

Example 10 includes the method of any of examples 1-9 wherein the DRL network includes a forgetting factor to weight long term versus short term rewards.

In example 11, a method of training a deep reinforcement learning (DRL) network to track an object and navigate a robot in an environment includes receiving tracking sensor input representing the object and the environment at multiple times, responsive to the tracking sensor input, calculating positions of the robot and the object at the multiple times, computing a tracking quality reward as a function of maintaining consisting object tracking at the multiple times, computing a navigation path quality reward as a function of an effective navigation path, and training the DRL network responsive to the tracking quality reward and navigation path quality reward over multiple actions of moving the robot.

Example 12 includes the method of example 11 wherein tracking quality reward is calculated as a function of a size of the object observed divided by the size of the object and distance of the object from the robot.

Example 13 includes the method of any of examples 11-12 wherein the DRL network is further responsive to estimate a traversability quality reward $r_v$ for a set of possible actions specifying movement of the object tracking robot, and determine the action via the DRL network that has also been trained as a function of the traversability quality reward $r_v$.

Example 14 includes the method of example 13 wherein the robot and object reside in the environment that is represented by a map, and the traversability quality reward $r_v = F_v(\text{average}_{T_m \in \Omega}\{\text{Dist}(T_{t+1}, T_m)\})$, where Dist is a distance measurement between the robot and obstacle and $T_m \in \Omega$ are a set of map points that representing the surface of an obstacle or wall and are within a distance threshold to Tt+1.

Example 15 includes the method of any of examples 11-14 wherein the sensing input comprises RGB image frame pixels, and further includes creating a sensing input by stacking pixels of multiple input sensing image frames in a past time window together, and wherein the DRL network uses the sensing input to estimate rewards and determine actions.

Example 16 includes the method of any of examples 11-15 and further including calculating a target loss, and updating the DRL network as a function of the target loss.

In example 17 a system for tracking an object and navigating an object tracking robot includes a memory storage comprising instructions and a processor in communication with the memory, wherein the processor executes the instructions to obtain tracking sensor input representing the object and an environment at multiple times, responsive to the tracking sensor input, calculate positions of the robot and the object at the multiple times, use a deep reinforcement learning (DRL) network that has been trained as a function of an object tracking quality reward and a robot navigation path quality reward to calculate positions of the robot and the object at the multiple times and determine an action specifying movement of the object tracking robot via the DRL network.

Example 18 includes the method of example 17 wherein the processor further executes the instructions to move the robot in accordance with the action.

Example 19 includes the method of any of examples 17-18 and further including a robot, wherein the memory storage and processor are integrated with the robot.

Example 20 includes the method of any of examples 17-19 wherein the DRL network has been trained as a further function of a traversability reward.

Any one of the foregoing examples may be combined with any one or more of the other foregoing examples to create a new embodiment within the scope of the present disclosure.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A method of tracking an object and navigating an object tracking robot, the method comprising:
   receiving tracking sensor input representing the object and an environment at multiple times;
   responsive to the tracking sensor input, calculating positions of the robot and the object at the multiple times; and
   using a computer implemented deep reinforcement learning (DRL) network trained as a function of tracking quality rewards and robot navigation path quality rewards, the DRL network being responsive to the calculated positions of the robot and the object at the multiple times to:
   determine possible actions specifying movement of the object tracking robot from a current position of the robot and target;
   determine quality values (Q-values) for the possible actions; and
   select an action as a function of the Q-values.

2. The method of claim 1 wherein the tracking quality rewards are a function of a size of the object observed divided by the size of the object and a distance of the object from the object tracking robot.

3. The method of claim 1 wherein the tracking quality rewards, $r_k$, are calculated in accordance with the following equation:

$$r_k = \frac{\text{Size(observed)}}{\text{Size(object)}} \cdot \frac{\text{Dist}(x_{t0} - C_{tx})}{L_{tx}} \cdot \frac{\text{Dist}(y_{t0} - C_{ty})}{L_{ty}}$$

where Size(object) and Size(observed) are sizes, in terms of pixel numbers, of the object and the actually observed portion of the object respectively, $C_{tx}$ and $C_{ty}$, an ideal horizontal and vertical location in an input sensing frame $I_t$, $L_{tx}$ and $L_{ty}$ are normalization factors, $x_{t0}$ and $y_{t0}$ are a location of the object, and Dist is a distance measurement to the object.

4. The method of claim 1 wherein the robot navigation path quality rewards, $r_p$, are defined as a function of the shortest valid distance between the object and the robot.

5. The method of claim 1 wherein the DRL network is further trained as a function of a traversability quality reward $r_v$ for the set of possible actions specifying movement of the object tracking robot.

6. The method of claim 5 wherein the traversability quality reward $r_v$ is defined as a function of an average distance between the object tracking robot and potential obstacles.

7. The method of claim 6 wherein the robot and object reside in the environment that is represented by a map, and the traversability quality reward $r_v=F_v(\text{average}_{T_m \in \Omega}\{\text{Dist}(T_{t+1}, T_m)\})$, where Dist is a distance measurement between the robot and obstacle and $T_m \in \Omega$ are a set of map points that represents a surface of an obstacle or wall and are within a distance threshold to $T_{t+1}$.

8. The method of claim 5 wherein the quality rewards are weighted.

9. The method of claim 1 wherein the sensing input comprises RGB image frame pixels, and further comprising:
creating a sensing input by stacking pixels of multiple input sensing image frames in a past time window together, and wherein the DRL network uses the sensing input to estimate rewards and determine actions.

10. The method of claim 1 wherein the DRL network includes a forgetting factor to weight long term versus short term rewards.

11. A method of training a deep reinforcement learning (DRL) network to track an object and navigate a robot in an environment, the method comprising:
receiving tracking sensor input representing the object and the environment at multiple times;
responsive to the tracking sensor input, calculating positions of the robot and the object at the multiple times;
computing a tracking quality reward as a function of maintaining consisting object tracking at the multiple times;
computing a navigation path quality reward as a function of an effective navigation path; and
training the DRL network responsive to the tracking quality reward and navigation path quality reward over multiple actions of moving the robot.

12. The method of claim 11 wherein the tracking quality reward is calculated as a function of a size of the object observed divided by the size of the object and distance of the object from the robot.

13. The method of claim 11 wherein the DRL network is further responsive to:
estimate a traversability quality reward $r_v$ for a set of possible actions specifying movement of the object tracking robot; and
determine the action via the DRL network that has also been trained as a function of the traversability quality reward $r_v$.

14. The method of claim 13 wherein the robot and object reside in the environment that is represented by a map, and the traversability quality reward $r_v=F_v(\text{average}_{T_m \in \Omega}\{\text{Dist}(T_{t+1}, T_m)\})$, where Dist is a distance measurement between the robot and obstacle and $T_m \in \Omega$ are a set of map points that representing the surface of an obstacle or wall and are within a distance threshold to $T_{1+1}$.

15. The method of claim 11 wherein the sensing input comprises RGB image frame pixels, and further comprising:
creating a sensing input by stacking pixels of multiple input sensing image frames in a past time window together, and wherein the DRL network uses the sensing input to estimate rewards and determine actions.

16. The method of claim 11 and further comprising:
calculating a target loss; and
updating the DRL network as a function of the target loss.

17. A system for tracking an object and navigating an object tracking robot, the comprising:
a memory storage comprising instructions; and
a processor in communication with the memory, wherein the processor executes the instructions to:
obtain tracking sensor input representing the object and an environment at multiple times;
responsive to the tracking sensor input, calculate positions of the robot and the object at the multiple times, use a deep reinforcement learning (DRL) network that has been trained as a function of an object tracking quality reward and a robot navigation path quality reward to:
calculate positions of the robot and the object at the multiple times, and
determine an action specifying movement of the object tracking robot via the DRL network.

18. The system of claim 17 wherein the processor further executes the instructions to move the robot in accordance with the action.

19. The system of claim 17 and further comprising a robot, wherein the memory storage and processor are integrated with the robot.

20. The system of claim 17 wherein the DRL network has been trained as a further function of a traversability reward.

* * * * *

UNITED STATES PATENT AND TRADEMARK OFFICE
CERTIFICATE OF CORRECTION

PATENT NO. : 10,695,911 B2
APPLICATION NO. : 15/870626
DATED : June 30, 2020
INVENTOR(S) : Jiang et al.

Page 1 of 1

It is certified that error appears in the above-identified patent and that said Letters Patent is hereby corrected as shown below:

In the Claims

In Column 22, Line 15, in Claim 14, delete "$T_{1+1}$." and insert --$T_{t+1}$.-- therefor Signed and Sealed this
Fifteenth Day of September, 2020

Andrei Iancu
*Director of the United States Patent and Trademark Office*